Aug. 18, 1964  J. L. CICH  3,144,716

DRIVER'S DAILY LOG COMPUTER

Filed June 23, 1959

INVENTOR.
John L. Cich
BY John J. Kowalik
Atty.

United States Patent Office 3,144,716
Patented Aug. 18, 1964

3,144,716
DRIVER'S DAILY LOG COMPUTER
John L. Cich, 2639 N. Melvina Ave., Chicago, Ill.
Filed June 23, 1959, Ser. No. 822,319
3 Claims. (Cl. 33—107)

This invention relates to computing devices and more specifically to a novel arrangement of a driver's report form and a companion computing device for calculating various activities recorded on the form.

It is a requirement by Federal Regulation that interstate truck drivers must maintain and submit at prescribed intervals a daily log itemizing, while on a trip, the hours spent off duty, in the sleeper berth, in driving, and on duty while not driving. The intent of the regulations is to restrict the operation of trucks by any driver to a stated safe maximum period and thereby promote highway safety.

A principal object of the invention is to provide a combination of a measuring device and a form on which there is imprinted a rectangular outline composed of four parallel strips or sections arranged in side by side relationship and respectively labeled off duty, sleeper berth, driving, and on duty not driving, the sections being graduated or subdivided into fifteen minute intervals represented by line lengths by the driver in the respective segments the time spent in each activity which are transferred to the computer which has a transparent body with graduations corresponding to those on the form and additively computed by a slider movably mounted on the body.

A further object is to provide a measuring device with a longitudinal slot in the body which is flexible and deflectable toward the form to permit direct and undistorted visualization of the form therebeneath.

A different object of the invention is to provide a novel slider which presents narrow edges to the paper upon which the computer is laid so as to minimize frictional drag as measurements are being made and thus insure accuracy.

Another object of the invention is to provide a novel measuring device wherein the rule body and the slider are automatically interlocked when the computer is lifted off the paper and which is readily released by pressing the rule body against the paper.

Another object is to provide a form and measuring device wherein the form provides measurable line lengths which are translated onto the ruler to provide totals.

Figure 1:
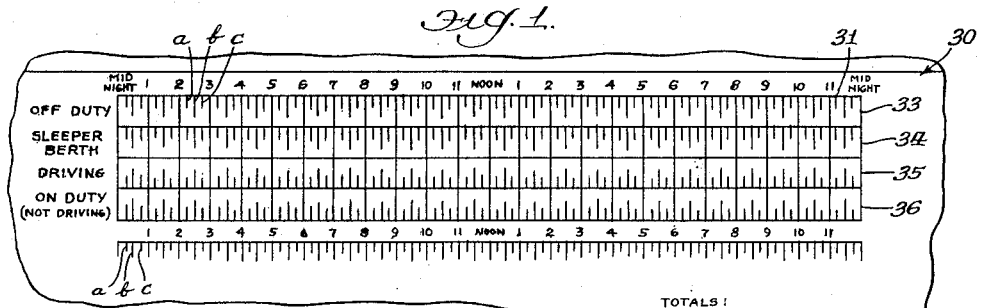
Figure 2:
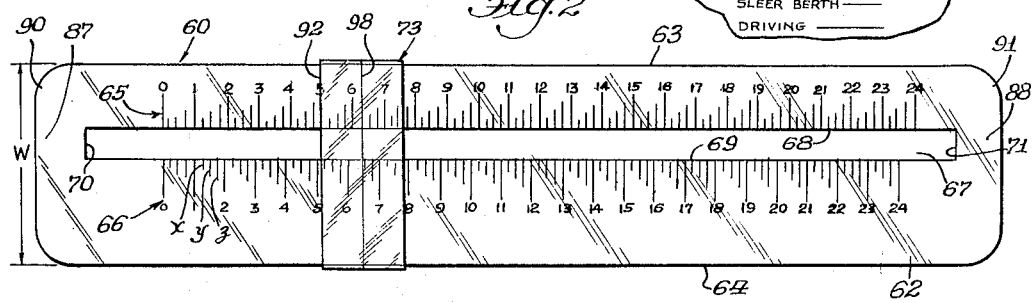
Figures 3, 4:
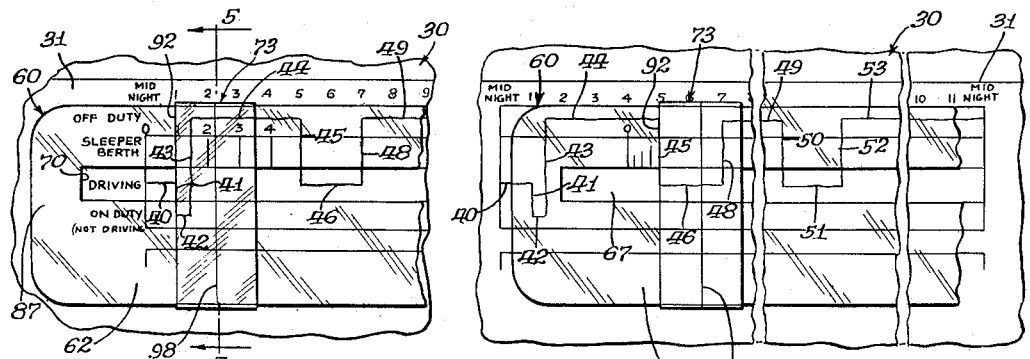
Figure 5:
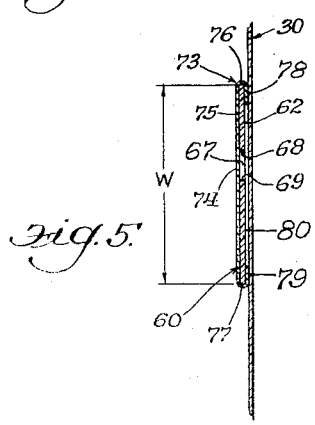
Figure 6:
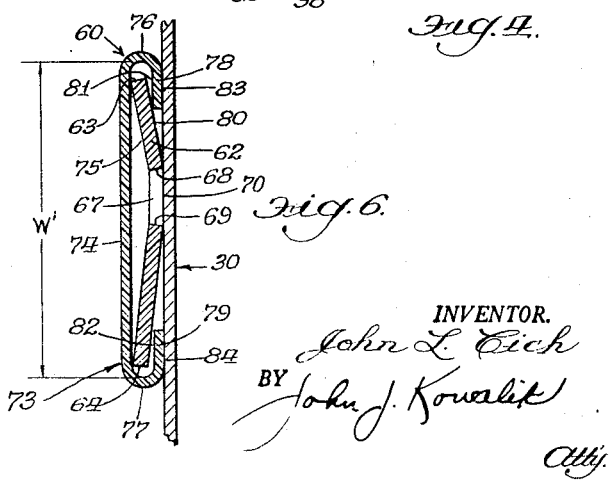

These and other objects of the invention will become more readily apparent from the specifications and the drawings, wherein:

FIGURE 1 is a fragmentary face view of the form;
FIGURE 2 is a front view of the computer;
FIGURE 3 is a composite view of the computer overlaid upon the form;
FIGURE 4 is a view similar to FIGURE 3 but showing the computer in another position;
FIGURE 5 is a transverse sectional view taken substantially on the line 5—5 of FIGURE 3, and
FIGURE 6 is an enlarged sectional view similar to FIGURE 5 illustrating the deflected position of the rule.

Describing the invention in detail there is shown a paper form generally designated 30 which has imprinted thereon a rectangular outline 31 in the shape of a rule including four strips or sections designated generally 33, 34, 35, and 36.

The section 33 is located at the top of the outline and at its left end is labeled with the legend "Off Duty."

The section 34 is next below the segment 33 and is coextensive therewith and is labeled adjacent to its left end with the phrase "Sleeper Berth."

The section 35 is immediately below the segment 34 and of corresponding length therewith and is designated at its left end with the word "Driving."

The section 36 is below the section 35 and is even therewith lengthwise and adjacent to its left end is provided with the designation "On Duty Not Driving."

All of these sections, which are in vertical alignment with one another and coextensive, are subdivided or graduated in time intervals with the left end designated "Midnight" followed by fifteen (interval) minute marks $a$, $b$, $c$, and then 1, 2, 3 etc., and terminating at its right end at "midnight." Thus a complete twenty four hour coverage is provided.

The driver in completing the form begins with "Midnight" at the left end of the outline. In the example of FIGURE 3 the driver made a horizontal line length indicated 40 from midnight to 1 a.m. in the column or segment designated "Driver." At 1 a.m. he drew a vertical line 41 from the right end of length 40 to the box or segment "On Duty Not Driving" and drew a horizontal line length 42 from the lower end of line 41 to indicate one half hour of this activity or until 1:30 a.m. He then drew a vertical line 43 from the right end of 42 and terminated in the top box labeled "Off Duty" where from the upper end of vertical line 43 he drew the horizontal line length 44 until 5 a.m. at which time he drew from the right end of line 44 a vertical line 45 which ends at its lower end in the 'Driving" box which has a line length 46 from the lower end of 45 which corresponds with 5:00 a.m. to 7:00 a.m. at which time the driver indicated by the vertical line length 48 to the box "Off Duty" and extending the line length 49 to 2 p.m. indicates the time not working or seven hours. Then the driver drew a vertical line 50 from the right end of line 49 and terminated the lower end of line 50 in the box "Driving" where he indicated by the line length 51 that he drove from 2 p.m. to 4 p.m. at which time by drawing the vertical line 52 from the right end of 51 and terminating line 52 at its upper end in the "Off Duty" column and drawing therein the line length 53 from 4 p.m. to midnight the driver indicates that he did not work the rest of the day. Thus a simple way is provided for accounting for each twenty four hour period while the driver is on a trip.

In calculating the various line lengths particularly where there are many fractions of an hour it becomes fatiguing and time consuming and thus leads to errors in calculation. To obviate this difficulty I have provided a novel computer.

The measuring device generally designated 60 is designed to simplify this task and to promote accuracy in reporting. The computer is made of transparent flexible material such as Lucite or any other plastic material and comprises a longitudinal rule body 62 with unit graduations 1 through 24 for the hours placed along its top and bottom edges respectively designated 63 and 64 with fifteen minute divisions between each digit indicated at $x$, $y$, $z$.

It will be noted that the upper scale of the rule is identical with that of the form. It will be understood that the scale of the form and computer are arbitrary and for such reason I have shown the scales at 65 and 66 different and thus useful with different forms having corresponding scales.

The ruler body 62 is provided with a medial longitudinal rectangular slot 67 defined by top and bottom edges 68 and 69 and end edges 70 and 71. It will be seen that the scribe lines 1, 2, etc. as well as the division lines $x$, $y$, and $z$ extend to edges 68 and 69 so that these lines can be brought into registry with the lines on the rule outline on the form as hereinafter described.

There is provided a rectangular slider 73 which mounts with its front portion 74 upon the front side 75 of the rule body, the slider and thus the portion 74 being transparent and made of preferably palpable plastic substance. The portion 74 is formed with upper and lower flanges 76 and 77 which respectively engage the top and bottom edges 63 and 64 of the ruler body. The flanges 76 and 77 merge into inturned flanges 78 and 79 which engage the back side 80 of the ruler with their internal sides 81 and 82 while the external sides 83 and 84 provide smooth small areas and permit easy movement of the slider particularly in view of the flexible nature of the body of the ruler, to slide upon the paper form.

It is preferred to make the width W of the rule body 62 in its relaxed state slightly larger than the distance W' between the internal sides of flanges 76 and 77 so that normally there is a resistance to free movement of the light slider by the body tending to expand laterally, which is flexible. In use the slotted construction of the body in addition to improving visibility of the form enhances its transverse flexibility whereby when it is in use and pressed at either 87 or 88 medially of its end portions 90 and 91, the edges 70 and 71 are brought close to the paper for more accurate reading and measuring and at the same time the slider is freed or unlocked from the body while under frictional restraint in engaging the paper with its flange portions 78 and 79, and as soon as the ruler is released the slider is automatically locked in place by the body tending to assume a planar position.

*Operation of the Device*

In use the measuring device is operative upon the movement of the slider so that its left edge 92 is brought into alignment with the "0" mark on the body 62. Then assuming that the driving length of time is to be computed from the form 30, the driver aligns the edge 92 with the left end of line 40 or the left end of the first line length indicating "Driving." In the present example he would align the index edge or the index mark 98 which has been placed at "0" on the ruler body, with the "Midnight" line at the left end of the outline and move the slider after releasing it as hereinbefore described, to the right until the edge 92 or mark 98 is aligned with the right end of line 40. He would then lift the computer off the form whereupon the slider is automatically locked. The driver then places the computer again on the form aligning the edge 92 of the slider with the left end of line length 46, then while pressing the body at 87 or 88 for releasing the slider and holding the computer in place, he moves the slider to the right end of 44 and again lifts the slider and computer. The same procedure is followed for line length 51 placing edge 92 in alignment with the left end of 51 and moving it to the right end after pressing the body down to the paper. The driver reads the final figure on the computer shown at the index edge or mark and notes five hours on the record form.

It will be understood that a preferred form of the invention is disclosed and that various other embodiments will become readily apparent to those skilled in the art within the scope of the appended claims.

I claim:

1. A measuring device having an elongated rule body with graduations thereon, a slider movably mounted thereon and having an index for registry with respective graduations, said body having top and bottom edges in tight engagement with opposing portions of said slider, said body having an elongated slot between said edges and being transversely flexible to reduce the width thereof to disengage said edges from said portions and accommodate easy sliding movement of the slider lengthwise of the rule body while said body is pressed into engagement with the subject to be measured.

2. A device for measuring line lengths upon an associated form and having an elongated body with top and bottom edges provided with graduations therealong, a member telescoped over the body and having opposing portions snugly engaging said body at said edges and having other portions of limited extent projecting under said body adjacent respective edges and presenting narrow contact areas for engagement with the form, said body being deflectible between said opposing portions toward the form by fulcruming upon said other portions away from said member to release said edges to permit relatively easy movement of said member while said body tightly engages said form at said other portions.

3. The combination of a record having a rule outline with time indicating graduations labeled respectively, off duty, sleeper berth, driving, and on duty not driving, and inscribed with line lengths in the respective sections corresponding with the time spent on the respective activity, a measuring instrument having a body with graduations corresponding to those on the form and having a zero line at one end and overlaid upon the form with the zero line at one end of the line length in the selected section to be measured, a slider having an index mark and movable upon the body to a position registering the index with the opposite end of the line being measured, said instrument being bodily movable to subsequent line lengths in the respective section and then oriented with the index at one end of the subsequent line length whereupon said slider is movable to the opposite end of the last-mentioned line length and thereby registering upon the graduations on the body the total of said line lengths, and said slider snugly embracing said body, and said body being flexible to loosen said slider and permit its movement, and said slider having a top portion overlaying said body and having portions of limited extent projecting under the body and having narrow areas of contact with the form for minimizing frictional resistance to movement of the slider upon the form, said body having a longitudinal slot therein for enhancing the deflection of the body toward the form with attendant fulcruming of the portions of the body adjacent to the edges thereof on said portions of the slider for thus elevating opposite edges of the body and releasing them from the slider.

References Cited in the file of this patent

UNITED STATES PATENTS

| | | |
|---|---|---|
| 784,274 | Pauli | Mar. 7, 1905 |
| 1,110,195 | Erwin | Sept. 8, 1914 |
| 1,353,279 | Schulthess | Sept. 21, 1920 |
| 1,615,510 | Grotendorst | Jan. 25, 1927 |
| 2,070,255 | Carlson | Feb. 9, 1937 |
| 2,226,906 | Henderson et al. | Dec. 31, 1940 |
| 2,230,927 | Bowman et al. | Feb. 4, 1941 |
| 2,438,337 | Gordon | Mar. 23, 1948 |
| 2,591,333 | Bellmer | Apr. 1, 1952 |
| 2,594,857 | Boos | Apr. 29, 1952 |

FOREIGN PATENTS

| | | |
|---|---|---|
| 878,735 | Germany | June 5, 1953 |
| 960,931 | Germany | Mar. 28, 1957 |